United States Patent [19]

Hyde et al.

[11] 4,334,927
[45] Jun. 15, 1982

[54] PISTON RING COATINGS

[76] Inventors: Glenn F. Hyde, 203 Medbury Rd., Timonium, Md. 21093; John E. Cromwell, 911 W. 38th St., Baltimore, Md. 21211

[21] Appl. No.: 214,121

[22] Filed: Dec. 8, 1980

[51] Int. Cl.³ .................. C22C 19/03; C22C 29/00; C22C 32/00
[52] U.S. Cl. ......................................... 75/240; 75/252
[58] Field of Search ................. 106/43; 75/240, 252; 277/224, 235 A

[56] References Cited

U.S. PATENT DOCUMENTS 3,150,938  9/1964  Pelton et al. ........................ 75/240
3,556,747  1/1971  Hyde et al. ......................... 75/240
3,971,633  7/1976  Wolfda et al. ...................... 75/240

Primary Examiner—O. R. Vertiz
Assistant Examiner—Mark Bell
Attorney, Agent, or Firm—Thomas L. Sivak; Oscar B. Brumback

[57] ABSTRACT

A coating for piston rings used in internal combustion engines such as diesel engines. The coating is comprised of a physical admixture of primary particles of chromium carbide, nickel chromium and molybdenum. The composition is applied to the piston ring face with a plasma-arc gun and imparts excellent wear resistance to the ring face while lowering cylinder liner wear.

4 Claims, 1 Drawing Figure

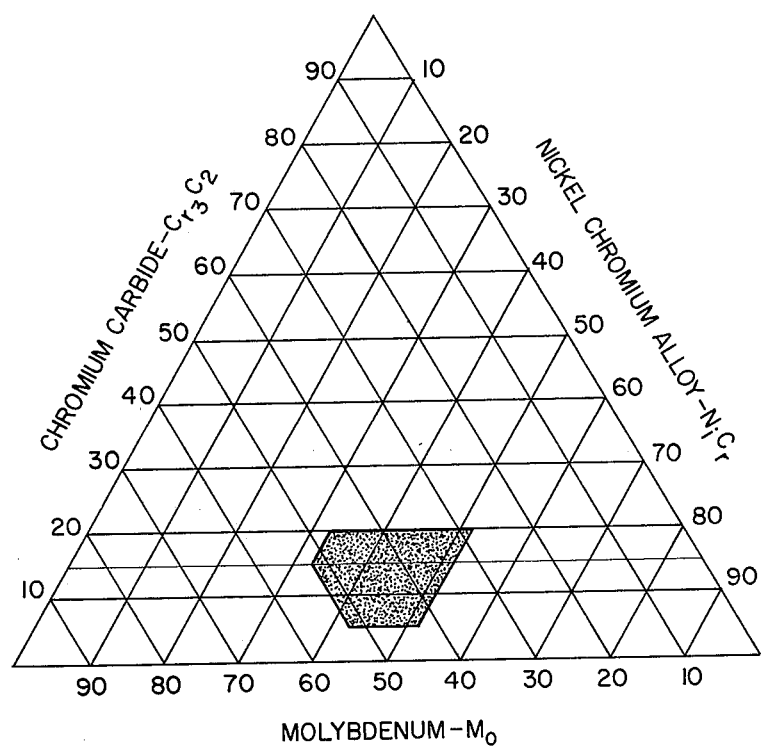

PISTON RING COATINGS

BACKGROUND OF THE INVENTION

1. Field of the Invention

The invention relates to wear resistant coatings and, more particularly, to wear resistant coatings for piston rings used in diesel engines.

2. Description of the Prior Art

Plasma deposited coatings normally provide good wear resistance in internal combustion engines. A variety of compositions are used to extend the wear resistance of the ring face which is in sliding contact with the cylinder wall or cylinder liner. This is usually accomplished by using blends of powders containing relatively large percentages by weight of carbides or oxides. These constituents in the coating have generally increased the wear resistance of the ring face, but in many instances they have caused an increase in the wear on the cylinder wall or cylinder liner. An analysis of many piston rings and cylinder liners after engine tests indicate that the high wear rates are predominately attributed to the aggressive nature of the carbides or metallurgical deterioration of the wearing surface which introduces debris into the engine. Therefore, while ring life improved, liner wear has become unacceptable. The coating disclosed in our U.S. Pat. No. 3,556,747 consists of an admixture of primary particles of chromium carbide, nickel chromium and molybdenum. In tests designed to improve the adhesion of the coating, thereby preventing the introduction of debris, the composition of nickel chromium and molybdenum was increased while the chromium carbide content was lowered. Surprisingly, engine test results of the modified coatings had lower wear rates on both the rings face and cylinder liner.

SUMMARY OF THE INVENTION

The present invention overcomes the problem of high wear rates by modifying the composition to obtain minimum wear on both the piston ring face and cylinder liners. This was accomplished by providing a coating for the piston ring in which the composition of the nickel chromium and molybdenum was increased while the chromium carbide was reduced.

BRIEF DESCRIPTION OF THE DRAWINGS

The FIGURE is a triangular graph illustrating the range of the commitments of the alloy.

DESCRIPTION OF THE PREFERRED EMBODIMENTS

The wearing surface of the piston ring or the like is coated with the composition of the present invention. The composition is a physical admixture of primary particles of powder. The size of the particles can vary from 5 to 105 microns. Preferably the size of the particles is from 44 to 88 microns. Particle size can be ascertained by screening the particles in accordance with ASTM Test B-214.

The chromium carbide component is a carbide having the formula $Cr_3C_2$. It should be at least 98 percent pure, but it may include minor amounts of iron or silicon. The range, as shown in the FIGURE, for this component is from 5 to 20 percent by weight. The chromium carbide imparts excellent wear resistance to the composition. The nickel-chromium component is an alloy used as a bonding material. The range for this component is from 32 to 51 percent by weight. The molybdenum component, which also imparts wear resistance, ranges from 29 to 51 percent by weight.

In one embodiment of the composition of the present invention, the preferred percentages of the primary particles are by weight: $Cr_3C_2$ 8.5 percent, NiCr 41.5 percent, and molybdenum 50 percent.

In a second embodiment of a composition of the present invention the preferred percentages of the primary particles are by weight: $Cr_3C_2$ 20 percent, NiCr 50 percent, and molybdenum 30 percent.

In a third embodiment of a composition of the present invention the preferred percentages of the primary particles are by weight: $Cr_3C_2$ 16 percent, NiCr 34 percent, and molybdenum 50.

Components of the present invention are physically mixed and applied to the surface to be coated with a plasma-arc gun. This is commercially available equipment, and the process for applying the coating to a surface is well known and understood in the art. While we have described the use of the present invention as a coating for piston rings, it can be used on the wearing surface of other articles that require a stable coating which has high wear resistance coupled with good antiscuffing properties. While we have described certain preferred embodiments of our invention, it will be understood it may be otherwise embodied within the scope of the following claims.

What is claimed:

1. A composition for coating the wearing surfaces of piston rings and the like consisting of a physical admixture of primary particles having a size of about 5 to 100 microns, said admixture comprised of 5 to 20 percent by weight chromium carbide ($Cr_3C_2$), 32 to 51 percent by weight nickel chromium alloy and 29 to 51 percent by weight molybdenum.

2. The composition of claim 1 wherein said admixture is comprised of 8.5 percent chromium carbide, 41.5 percent nickel chromium and 50 percent molybdenum by weight.

3. The composition of claim 1 wherein said admixture is comprised of 20 percent chromium carbide, 50 percent nickel chromium and 30 percent molybdenum, by weight.

4. The composition of claim 1 wherein said admixture is comprised of 16 percent chromium carbide, 34 percent nickel chromium and 50 percent molybdenum, by weight.

* * * * *